(12) United States Patent
Shao

(10) Patent No.: US 10,661,172 B2
(45) Date of Patent: May 26, 2020

(54) VISUAL DISPLAY METHOD AND APPARATUS FOR COMPENSATING SOUND INFORMATION, STORAGE MEDIUM AND DEVICE

(71) Applicant: NETEASE (HANGZHOU) NETWORK CO.,LTD., Hangzhou (CN)

(72) Inventor: Teng Shao, Hangzhou (CN)

(73) Assignee: NETEASE (HANGZHOU) NETWORKS CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/103,898

(22) Filed: Aug. 14, 2018

(65) Prior Publication Data
US 2019/0099673 A1 Apr. 4, 2019

(30) Foreign Application Priority Data

Sep. 30, 2017 (CN) .......................... 2017 1 0938744

(51) Int. Cl.
*A63F 13/00* (2014.01)
*A63F 13/5375* (2014.01)
(Continued)

(52) U.S. Cl.
CPC .......... *A63F 13/5375* (2014.09); *A63F 13/54* (2014.09); *A63F 13/92* (2014.09); *A63F 13/426* (2014.09)

(58) Field of Classification Search
None
See application file for complete search history.

(56) References Cited

U.S. PATENT DOCUMENTS

2004/0229687 A1* 11/2004 Miyamoto ............... A63F 13/10
463/30
2007/0021203 A1* 1/2007 Edwards ................. A63F 13/10
463/30
(Continued)

FOREIGN PATENT DOCUMENTS

CN 103620669 A 3/2014
CN 103990282 A 8/2014
(Continued)

OTHER PUBLICATIONS

The diary of kakaku01.
(Continued)

*Primary Examiner* — Paul A D'Agostino
(74) *Attorney, Agent, or Firm* — Yunling Ren

(57) ABSTRACT

The present disclosure provides a visual display method and apparatus for compensating sound information, a storage medium, and an electronic device, and relates to the field of human-computer interaction technologies. The method includes: providing an orientation ruler on a graphical user interface, the orientation ruler including an orientation identifier for indicating an orientation; detecting a sound in a first preset range of a game scene, and when the sound in the first preset range of the game scene is detected, acquiring orientation information of a sound source of the sound; and generating a graphic identifier corresponding to the sound at a corresponding position of the orientation ruler according to the orientation information.

17 Claims, 6 Drawing Sheets

S1: Provide an orientation ruler on a graphical user interface, the orientation ruler including an orientation identifier for indicating an orientation S2: Detect a sound in a first preset range of the game scene, and when the sound in the first preset range of the game scene is detected, acquire orientation information of a sound source of the sound S3: Generate a graphic identifier corresponding to the sound at a corresponding position of the orientation ruler according to the orientation information

(51) Int. Cl.
*A63F 13/54* (2014.01)
*A63F 13/92* (2014.01)
*A63F 13/426* (2014.01)

(56) References Cited

U.S. PATENT DOCUMENTS

| | | | | |
|---|---|---|---|---|
| 2007/0218966 | A1* | 9/2007 | Tilston | A63F 13/10 463/5 |
| 2013/0141551 | A1* | 6/2013 | Kim | H04N 5/445 348/51 |
| 2014/0126758 | A1* | 5/2014 | Van Der Wijst | H04S 7/304 381/310 |
| 2014/0172432 | A1* | 6/2014 | Sendai | G10L 21/10 704/276 |
| 2014/0294183 | A1* | 10/2014 | Lee | H04R 3/005 381/56 |
| 2016/0054807 | A1 | 2/2016 | Flagg | |
| 2016/0064002 | A1* | 3/2016 | Kim | G10L 15/22 704/246 |
| 2016/0080650 | A1* | 3/2016 | Okazawa | H04N 21/4312 348/36 |
| 2016/0098138 | A1* | 4/2016 | Park | G06F 3/0416 345/173 |
| 2016/0142830 | A1* | 5/2016 | Hu | G02C 11/06 434/185 |
| 2016/0313973 | A1* | 10/2016 | Yajima | G06F 3/165 |
| 2017/0354884 | A1* | 12/2017 | Benedetto | A63F 13/537 |
| 2017/0354892 | A1* | 12/2017 | Benedetto | A63F 13/87 |
| 2018/0084367 | A1* | 3/2018 | Greff | G06F 3/165 |
| 2018/0256977 | A1* | 9/2018 | Wakasono | A63F 13/5378 |

FOREIGN PATENT DOCUMENTS

| | | |
|---|---|---|
| CN | 104460986 A | 3/2015 |
| KR | 20130006905 A | 1/2013 |
| WO | 2010038296 A1 | 4/2010 |

OTHER PUBLICATIONS

To discover the enemy soldier by 'sound indicator' which makes sound visualized.
Increasingly hot gal bread! Start the tank road in World of Tanks.
The JP1OA issued Oct. 23, 2019 by the JPO.
https://www.bilibili.com/video/av14874259/.
https://www.bilibili.com/video/av14904906/.
https://www.hackhome.com/InfoView/420861_full.html.
http://www.yiwan.com/gonglue/368054.html.
http://news.mydrivers.com/1/550/550208.htm.
http://mb.zol.com.cn/385/3853507.html.
The CN1OA issued Aug. 20, 2019 by the CNIPA.

* cited by examiner

VISUAL DISPLAY METHOD AND APPARATUS FOR COMPENSATING SOUND INFORMATION, STORAGE MEDIUM AND DEVICE

CROSS REFERENCE

This application is based upon and claims priority to Chinese Patent Application No. 201710938744.1, filed on Sep. 30, 2017, the entire contents thereof are incorporated herein by reference.

TECHNICAL FIELD

The present disclosure relates to the field of human-computer interaction technologies, and more particularly, to a visual display method and apparatus for compensating sound information, a storage medium, and an electronic device.

BACKGROUND

In a game of conventional terminals (such as PC, or console device), a user may control a virtual object in the game scene and make different kinds of game operation under various environment, then the user has to acquire an environment information based on the current position of the virtual object, such as the type and the location of a sound in a certain area of the game scene. For example, a location of an enemy character in the game may be determined by sound variation of footsteps, and for another example, a danger signal may be triggered by gunshots from the other virtual characters in the game. Therefore, in a conventional PC game, which is generally placed at home or a relatively quiet space, the user can quickly determine the environment in which the virtual object is located according to the sound in the game, and make a fast response. In addition, the immersion is not easily interrupted due to the application occasion of the conventional terminal, especially with a good earphone or sound equipment, which will bring a better gaming experience to the user.

At present, with the popularization of mobile terminals, games are increasingly developed on the mobile terminals. However, compared with a conventional terminal, application occasions of the game on the mobile terminal are relatively wider with the characterization of portability. When the mobile terminal is applied in a noisy occasion, it is difficult for the user to determine the environment in which the virtual object controlled by the user is located through the sound in the game, and the immersion of game is easily interrupted.

It should be noted that the information disclosed in the above background section is only for enhancement of understanding of the background of the present disclosure and therefore can include other information that does not form the prior art that is already known to those of ordinary skills in the art.

SUMMARY

The present disclosure aims at providing a visual display method and apparatus for compensating sound information, a storage medium, and an electronic device.

According to an aspect of the present disclosure, there is provided a visual display method for compensating sound information, applied to a touch terminal with a touch screen, a graphical user interface is rendered on the touch screen, the graphical user interface at least partially comprising a game scene, and at least part of a virtual object. The method includes.

providing an orientation ruler on the graphical user interface, the orientation ruler including an orientation identifier for indicating an orientation;

detecting a sound in a first preset range of the game scene, and when the sound in the first preset range of the game scene is detected, acquiring orientation information of a sound source of the sound; and generating a graphic identifier corresponding to the sound at a corresponding position of the orientation ruler according to the orientation information.

The present disclosure further discloses a visual display apparatus for compensating sound information, applied to a touch terminal with a touch screen, a graphical user interface is rendered on the touch screen, the graphical user interface at least partially comprising a game scene, and at least part of a virtual object. The apparatus includes.

an orientation ruler module configured to provide an orientation ruler on the graphical user interface, the orientation ruler including an orientation identifier for indicating an orientation;

a detection and acquisition module configured to detect a sound in a first preset range of the game scene, and when the sound in the first preset range of the game scene is detected, acquire a relative orientation of a sound source of the sound relative to the virtual object; and a control module configured to generate a graphic identifier corresponding to the sound at a corresponding position of the orientation ruler according to the relative orientation.

The present disclosure further discloses a computer readable storage medium storing a computer program thereon, wherein the computer program is executed by a processor to implement any of the forgoing visual display methods for compensating sound information.

The present disclosure further discloses an electronic device, including.

a processor; and a memory for storing executable instructions of the processor;

wherein the processor is configured to execute any one of the forgoing visual display methods for compensating sound information via executing the executable instructions.

It should be understood that the foregoing general description and the following detailed description are exemplary and explanatory only, and cannot limit the present disclosure.

BRIEF DESCRIPTION OF THE DRAWINGS

By describing the exemplary embodiments in detail with reference to the drawings, the above and other features and advantages of the present disclosure will become more apparent. Obviously, the drawings in the following description merely relate to some embodiments of the present disclosure, and based on these drawings, those of ordinary skills in the art may obtain other drawings without paying any creative effort. In the drawings.

DETAILED DESCRIPTION

Figure 1:
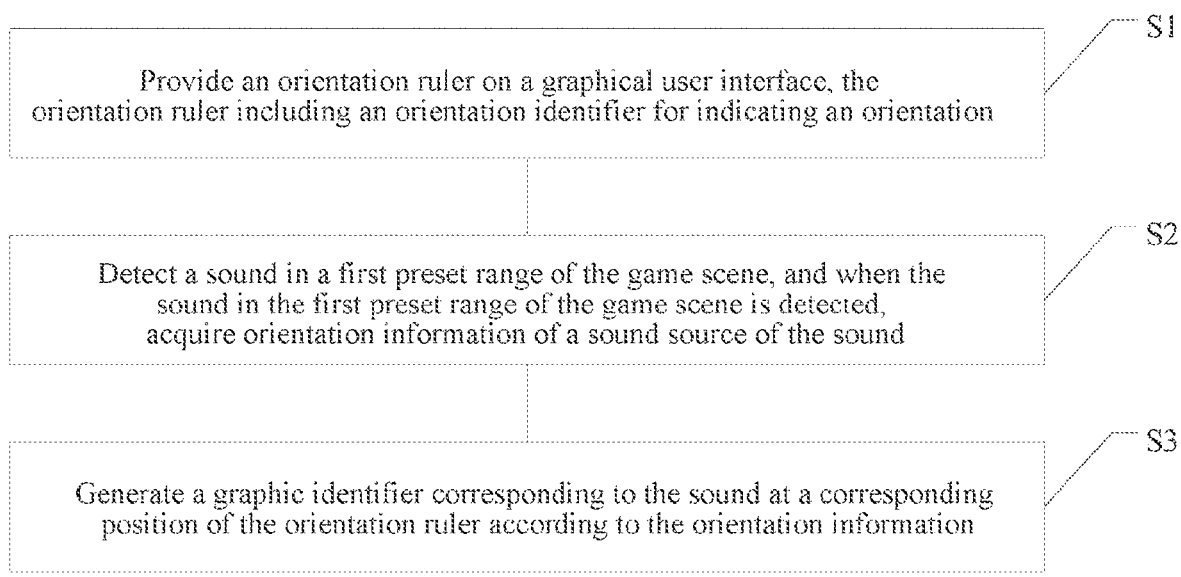
FIG. 1 is a flow chart of a visual display method for compensating sound information according to the present disclosure.

The example embodiments will be now described more comprehensively with reference to the drawings. However, the example embodiments can be embodied in many forms and should not be construed as being limited to the embodiments set forth herein; on the contrary, these embodiments are provided so that the present disclosure will be comprehensive and complete, and the concept of the example embodiments will be comprehensively conveyed to those skilled in the art. The same reference numerals in the drawings denote the same or similar parts; therefore, the repeated description thereof will be omitted.

Furthermore, the described features, structures, or characteristics may be combined in any suitable manner in one or more embodiments. In the following description, numerous specific details are set forth, so as to give sufficient understanding on the embodiments of the present disclosure. However, those skilled in the art will appreciate that the technical solutions of the present disclosure may be practiced without one or more of the specific details, or other methods, constituent elements, materials, apparatuses, steps, etc. may be employed. In other instances, well-known structures, methods, apparatuses, implementations, materials, or operations are not illustrated or described in detail to avoid obscuring various aspects of the present disclosure.

The block diagrams shown in the drawings are merely functional entities and do not necessarily have to correspond to physically separate entities. In other words, these functional entities may be implemented in software, or these functional entities or a part of the functional entities is implemented in one or more software-hardened modules, or these functional entities are implemented in different network and/or processor apparatuses and/or microcontroller apparatuses.

First, the exemplary embodiments disclose a visual display method for compensating sound information, applied to a touch terminal capable of presenting a graphical user interface at least partially including a game scene, and at least partially including a virtual object. The touch terminal may be, for example, an electronic device having a touch screen such as a mobile phone, a tablet, a game machine, or a PDA. A game application may control a touch screen of a touch terminal through an application program interface of the touch terminal to display a virtual object, a virtual joystick area including the virtual joystick, a virtual battle scene, and a virtual natural environment, etc. The graphical user interface may either be performed on the entire or partial area of the touch screen, which is not specifically limited in the exemplary embodiments. The virtual object refers to a game character manipulated by a user, and is displayed in a partial or overall form of the game character on the graphical user interface. For example, in a first person perspective, the content of the graphical user interface is displayed by a master perspective of the user, which enhances the immersive experience of the user, and only a part of the game character, such as a hand or foot, may be presented in the interface; while in a third-person perspective, the game character may be presented on the graphical user interface as a whole, which reduces the manipulation difficulty and dizziness of the user, and emphasizes the visual sense of movement. The developer may determine the detailed display manner according to the game contents, which will not be limited in the present disclosure. As shown in FIG. 1, the visual display method for compensating sound information may include the following steps.

In step S1, an orientation ruler is provided on the graphical user interface, the orientation ruler including an orientation identifier for indicating an orientation.

In step S2, it is detected whether there is a sound in a first preset range of the game scene, and when the sound in the first preset range of the game scene is detected, orientation information of a sound source of the sound is acquired.

In step S3, a graphic identifier corresponding to the sound is generated at a corresponding position of the orientation ruler according to the orientation information.

By providing the orientation ruler on the graphical user interface, and indicating the orientation information of the sound source of the detected sound in the corresponding position of the orientation ruler via the graphic identifier, the orientation of the sound source is presented by the visual display compensation of the orientation ruler when the user turns off the game sound, or is in a noisy environment, or the device lacks the condition of expressing the orientation of the sound source through the left and right voice channels.

The visual display method for compensating sound information in the present exemplary embodiment will be further described with reference to FIGS. 1 to 6 hereinafter.

In step S1, the orientation ruler is provided on the graphical user interface, the orientation ruler including the orientation identifier for indicating an orientation.

Figure 2:
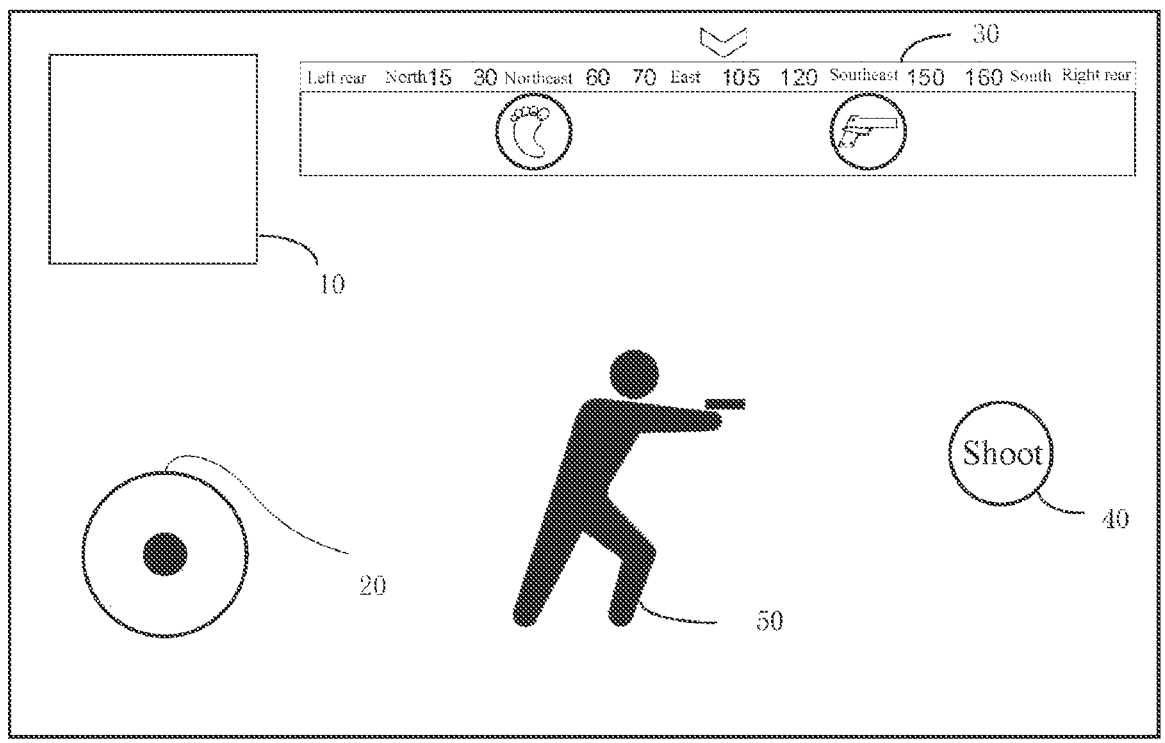
FIG. 2 is a schematic diagram of a graphical user interface involved in a visual display method for compensating sound information according to the present disclosure.
Figure 3:
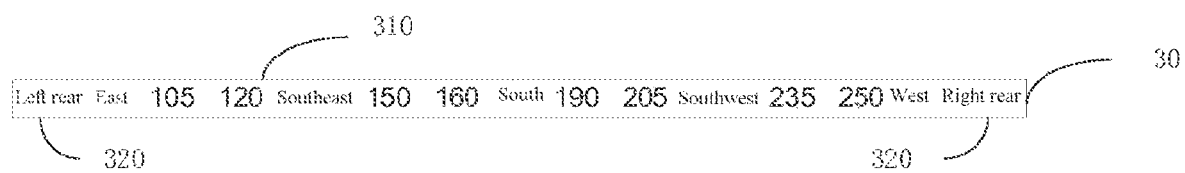
FIG. 3 is a schematic diagram of an orientation ruler in an exemplary embodiment of the present disclosure.
Figure 4:
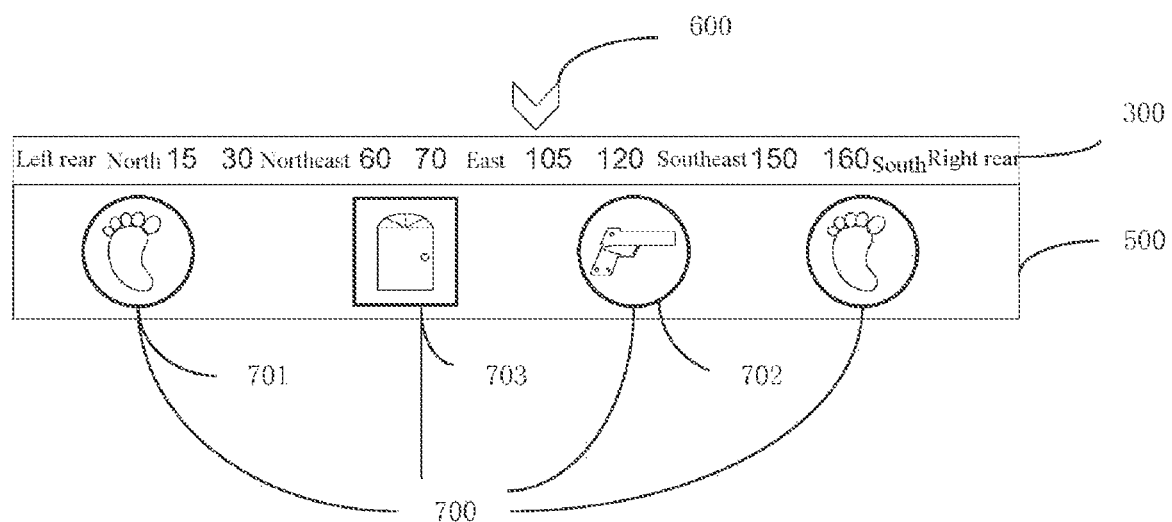
FIG. 4 is a schematic diagram of an orientation ruler and related components in an exemplary embodiment of the present disclosure.

In the embodiment as shown in FIG. 2, the graphical user interface includes a mobile manipulation area 20 for controlling movement of a virtual object character 50, a skill control 40 for controlling skill cast of the virtual character, and a small map 10 for displaying a thumbnail of at least part of the game scene. The embodiment provides an orientation ruler 30 on the graphical user interface. The orientation ruler 30 includes an orientation identifier for indicating an orientation. The orientation identifier may include at least one of an orientation scale and an orientation description. The orientation ruler 30 as shown in FIG. 3 not only includes the orientation scale 310 represented in numeral such as 105, 120 and 150 and represented in text such as east (E), southeast (SE), south (S) and southwest (SW); and further includes the orientation description 320. In an example, the orientation description is described in text, but may also be graphically described. The orientation ruler 30 of FIG. 2 is described in text, wherein "left rear" is displayed at a leftmost side and "right rear" is displayed at a rightmost side. The orientation description may reduce the understanding difficulty for a game player to understand the orientation ruler on one hand, and on the other hand, due to the limited space of the graphical user interface on the screen, it may be difficult to display all of the scale is ranged from 0 to 360 degree of the orientation ruler on the screen, so that, it may be suggested to display details of partially focused scale on the graphical user interface, while the other part of scale may be generalized to display as the orientation description. In the embodiment as shown in FIG. 4, an area of the game scene behind the virtual object is generally presented as left rear and right rear on the orientation ruler.

For the orientation ruler 30, the form of the orientation ruler as shown in FIG. 2 may be adopted, and other forms that may indicate the orientation may also be adopted, for example, as a form of a simulated compass, an arc-shaped dial, or the like.

In step S2, the sound in the first preset range of the game scene is detected, and when it is detected that there is the sound in the first preset range of the game scene, the orientation information of the sound source of the sound is acquired.

In the exemplary embodiment, a size of the first preset range may be set by the developer according to game contents. In an example, the first preset range is an range determined according to a position of the virtual object in the game scene, for example, the first preset range may be a range determined according to an auditory range of a virtual character, and may also be an entire area of the game scene, a range of the game scene displayed on the graphical user interface, or the like. The developer may also set a setting rule of the first preset range according to game requirements, for example, multiple conditions may be adopted as the setting rule, for example, an area within a preset range and being not completely blocked by a sound absorbing obstacle may be set as the first preset range.

The sound in the first preset range may be detected by a detection module at a preset period, and the preset period may be set by the developer. However, in order to ensure the detection accuracy, it is unallowable to set the preset period to be too large.

When the sound is detected, the orientation information of the sound source of the sound relative to the virtual object is acquired. The orientation information may be a relative orientation of the sound source relative to the virtual object, or may be an orientation of the sound source in the game scene, or both of the two are acquired at the same time. The developer may determine the orientation information according to the specific requirements of the game. On one hand, it is possible to determine the orientation information to be displayed on the graphical user interface of the game according to the information. For example, if only the relative orientation of the sound source relative to the virtual object should be indicated, then the relative orientation may be acquired; otherwise, the orientation of the sound source in the game scene may be acquired. On the other hand, it is possible to determine the orientation information based on the convenience of acquiring data from a game engine. If it is more convenient to acquire the relative orientation, then the relative orientation may be adopted. In addition, since models of the sound source and the virtual object in the game are generally built up in the same coordinate system, the relative orientation and the orientation of the sound source in the scene may be mathematically converted to each other. Therefore, the developer may acquire one of the relative orientation and the orientation of the sound source in the scene, and then obtain the other by mathematical conversion. The orientation of the sound source may also be directly acquired by coordinates of the sound source, and it may also be calculated by acquiring the orientation information after obtaining the coordinates.

In an exemplary embodiment, in order to provide much compensation to display more information, excluding the orientation information, the following data may also be acquired simultaneously, a type of sound, a distance between the sound source and the virtual object, and the like, so that the type of the sound is acquired by a sound type acquisition module. The type of the sound may be a sound of a footstep, a conversation, a door opening, a gunshot, a fighting, etc., which is not specifically limited in the exemplary embodiment.

Coordinates of the virtual object and coordinates of the sound source of the sound may be acquired, and the distance between the sound source of the sound and the virtual object and the orientation of the sound source of the sound relative to the virtual object may be calculated according to the coordinates of the virtual object and the coordinates of the sound source of the sound.

in step S3, the graphic identifier corresponding to the sound is generated at the corresponding position of the orientation ruler according to the relative orientation.

As shown in FIG. 4, in order to compensate and display the sound information for the user, in the present embodiment, a graphic display area 500 is arranged under the orientation ruler 300, a graphic identifier 700 corresponding to the sound is displayed in the graphic display area 500, and a display position of the graphic identifier 700 is controlled to be located at a corresponding position of the orientation ruler according to the orientation information of the sound.

As an example embodiment, the graphic identifier 700 may be used as a same one for all sounds without distinguishing the type of the sound, but this manner is not beneficial to the player to distinguish the various types of the sounds. Therefore, in an example, different graphic identifiers are used for different sounds. In the embodiment as shown in FIG. 4, the sound comprises the sound of a footstep, a gunshot, and a door opening; correspondingly, the different ideographic graphs are used to indicate different types of sounds. A sole ideographic graph 701 is used to indicate the footstep sound, a pistol ideographic graph 702 is used to indicate the gunshot sound, and a door-shaped ideographic graph 703 is used to indicate the door opening sound. The types of sound, the ideographic graphs and the corresponding relationships thereof may be pre-stored in the game. When the type of the sound is acquired, the ideographic graph may be presented on the graphical user interface by querying such pre-stored contents.

As an example embodiment, as described above, in the case of acquiring the distance between the sound source and the virtual object, the display form of the graphic identifier may also be controlled according to the distance, such as, at least one of a size, a color, a brightness, a transparency, and a dynamic effect of the graphic identifier may be controlled according to the distance. In the embodiment as shown in FIG. 4, the size of the graphic identifier 700 is corresponding to the distance.

In the exemplary embodiment, the controlling the graphic identifier 700 according to the distance between the sound source of the sound and the virtual object may include the following manners.

According to a first manner, the display form of the graphic identifier is controlled according to the distance between the sound source of the sound and the virtual object.

In the exemplary embodiment, the transparency of the graphic identifier is inversely related to the distance between the sound source of the sound and the virtual object, i.e., the further the distance between the sound source of the sound and the virtual object is, the higher the transparency of the graphic identifier is; and the closer the sound source of the sound relative to the virtual object is, the lower the transparency of the graphic identifier is. It should be noted that the transparency of the graphic identifier is ranged from 100% to 0%. The graphic identifier is completely transparent when the transparency of the graphic identifier is 100%, and the graphic identifier is completely opaque when the transparency of the graphic identifier is 0%.

Figure 5:
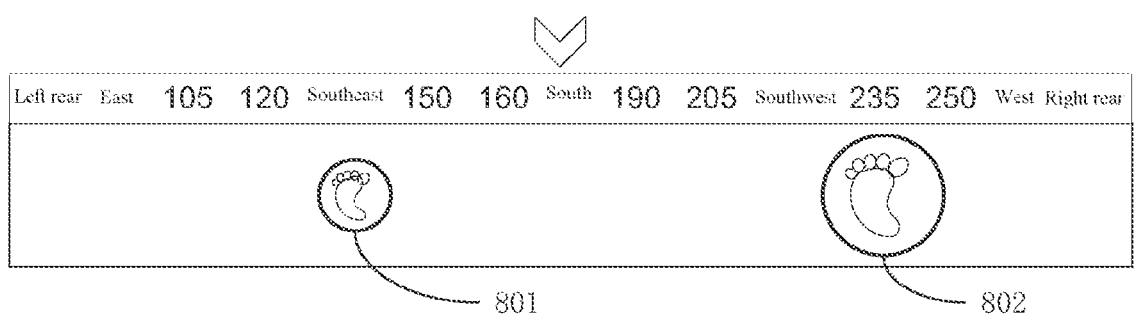
FIG. 5 is a schematic diagram of an orientation ruler and related components in another exemplary embodiment of the present disclosure.

In a second manner, the display form of the size of the graphic identifier is controlled according to the distance between the sound source of the sound and the virtual object.

in the exemplary embodiment, the size of the graphic identifier is inversely related to the distance between the sound source of the sound and the virtual object. In other words, the further the distance between the sound source of the sound and the virtual object is, the smaller the size of the graphic identifier is, and the closer the distance between the sound source of the sound and the virtual object is, the larger the size of the graphic identifier is. As shown in FIG. 5, for example, two sounds of the footstep are detected near the virtual object, two graphic identifiers are respectively corresponding to 801 and 802, and the sound source of the sound corresponding to the graphic identifier 802 is closer to the position of the virtual object, compared with the other sound source corresponding to the graphical identifier 801.

In a third manner, the display form of the brightness of the graphic identifier is controlled according to the distance between the sound source of the sound and the virtual object.

In the exemplary embodiment, the brightness of the graphic identifier is inversely related to the distance between the sound source of the sound and the virtual object, i.e., the further the distance between the sound source of the sound and the virtual object is, the lower the brightness of the graphic identifier is; and the closer the distance between the sound source of the sound and the virtual object is, the higher the brightness of the graphic identifier is.

It should be noted that, any one, two, three, or four display forms of the transparency, the size, the brightness, and the dynamic effect of the graphic identifier may also be applied according to the distance between the sound source of the sound and the virtual object.

As a specific example embodiment, the orientation ruler is further configured to indicate a current orientation of the virtual object in the game scene, such as to indicate the virtual object is faced to the front of the game scene in the current state. The indication of the current orientation of the virtual object may be the same as the indication method of the sound orientation, for example, generating a graphic identifier of the virtual object at a corresponding position of the orientation ruler.

According to another example embodiment, as shown in FIG. 4, an orientation indicator 600 may be provided on the graphical user interface. For example, the orientation indicator 600 is arranged above the middle of orientation ruler 300. The orientation ruler 30 is controlled to scroll on the graphical user interface according to the current orientation of the virtual object, such that a position indicated by the orientation indicator 600 on the orientation ruler 300 is corresponding to the current orientation of the virtual object. In the exemplary embodiment, a manner of fixing the position of the orientation indicator 600 and scrolling the orientation ruler is adopted to make the orientation of the virtual object is always represented by the position indicated by the orientation indicator 600 on the orientation ruler 300. In this manner, the orientation indicator 600 may also provide such orientation information as a reference to the game player while indicating the orientation, so that the player can approximately judge the orientation of the sound source without checking the specific scale of the orientation ruler.

The orientation indicator 600 may be displayed as the form of a triangle, an arrow, or other suitable graphic pattern, which will not be limited in the present disclosure.

Figure 6:
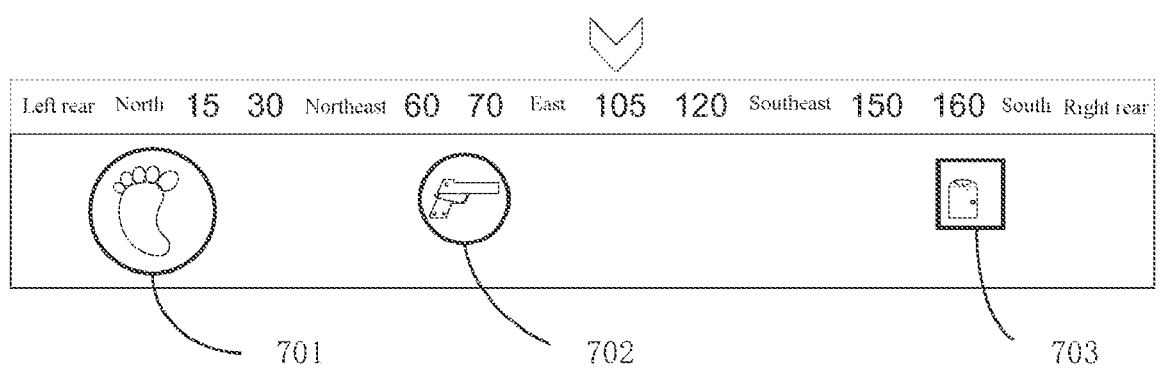
FIG. 6 is a schematic diagram of a graphical user interface in another exemplary embodiment of the present disclosure.

Hereinafter, a manner of the present disclosure will be described with reference to FIG. 6 by way of an exemplary embodiment. In this embodiment, the visual display of the present disclosure will be described by taking three sounds as multiple sounds as an example.

For example, the above three sounds are respectively described as a first sound, a second sound, and a third sound, wherein types of the first to third sounds are a sound of footstep, a sound of gunshot, and a sound of door opening respectively, distances between sound sources of the first to third sounds and the virtual objects are 10 m, 20 m, and 30 m respectively, and orientations of the sound sources of the first to third sounds relative to the virtual object are north, 60-70 degrees in the northeast (NE), and 160 degrees in the southeast (SE) respectively. The sole ideographic graph 701 is used to indicate the sound of footstep, the pistol ideographic graph 702 is used to indicate the sound of gunshot, and the door-shaped ideographic graph 703 is used to indicate the sound of door opening. Based on this, the sole ideographic graph 701 is controlled to be the largest, the pistol ideographic FIG. 702 is controlled to be the second, and the door-shaped ideographic graph 703 is controlled to be the smallest according to the distance, and each icon is located at a corresponding scale position of the orientation ruler. The current orientation of the virtual object in the game scene (for instance, the current front orientation) is at a 105-degree position. As an embodiment, the player may control the orientation of the virtual object by a touch operation, and if the orientation of the virtual object changes, the orientation ruler is scrolled correspondingly to keep the current orientation in the position indicated by the orientation indicator all the time.

The exemplary embodiments of the present disclosure further provide a visual display method for compensating sound information, applied to a touch terminal capable of presenting a graphical user interface, the graphical user interface at least partially including a game scene, and at least partially including a virtual object. The touch terminal may be, for example, an electronic device having a touch screen such as a mobile phone, a tablet, a game machine, or a PDA. A game application may control a touch screen of the touch terminal through an application program interface of the touch terminal to display a virtual object, a virtual joystick area including the virtual joystick, a virtual battle scene, and a virtual natural environment, etc. The graphical user interface may either be performed on the entire area or partial area of the touch screen, which is not specifically limited in the exemplary embodiments. The virtual object refers to a game character manipulated by a user, and is displayed in a partial or overall form of the game character on the graphical user interface. For example, in a first person perspective, the content of the graphical user interface is displayed by a master perspective of the user, which enhances the immersive experience of the user, and only a part of the game character, such as a hand or a foot, may be presented in the interface, while in a third-person perspective, the game character may be presented on the graphical user interface as a whole, which reduces the manipulation difficulty and dizziness of the user, and emphasizes the visual sense of movement. The developer may determine the detailed display manner according to the game contents, which will not be limited in the present disclosure.

The exemplary embodiments of the present disclosure further provide a visual display apparatus for compensating sound information. The present disclosure further discloses a visual display apparatus for compensating sound information, applied to a touch terminal capable of presenting a graphical user interface, the graphical user interface at least partially including a game scene, and at least partially including a virtual object. The apparatus includes: an orientation ruler module, a detection and acquisition module and a control module.

The orientation ruler module is configured to provide an orientation ruler on the graphical user interface, the orientation ruler including an orientation identifier for indicating an orientation.

The detection and acquisition module is configured to detect a sound in a first preset range of the game scene, and when the sound in the first preset range of the game scene is detected, acquire a relative orientation of a sound source of the sound relative to the virtual object.

The control module is configured to generate a graphic identifier corresponding to the sound at a corresponding position of the orientation ruler according to the relative orientation.

The specific details of the above-mentioned various visual display apparatus modules for compensating sound information have been described in detail in the visual display methods for compensating sound information, and therefore will not be elaborated herein.

It should be noted that although several modules or units of the device for execution have been mentioned in the detailed description above, this division is not mandatory. In fact, according to the embodiments of the present disclosure, the features and functions of the two or more modules or units described above may be embodied in one module or unit. On the contrary, the features and functions of one module or unit described above may be further divided to be embodied by multiple modules or units.

The exemplary embodiments of the present disclosure further provide an electronic device capable of implementing the above-mentioned method.

Those skilled in the art will appreciate that various aspects of the present disclosure can be implemented as a system, method, or program product. Accordingly, various aspects of the present disclosure may be concretely embodied in the following forms, i.e.: a complete hardware implementation, a complete software implementation (including firmware, microcode, etc.), or a combination of hardware and software implementations, which may be collectively referred to as "circuits", "modules", or "systems" herein.

The present disclosure further discloses an electronic device, including: a processor; and
a memory for storing executable instructions of the processor;
wherein, the processor is configured to execute any one of the forgoing visual display methods for compensating sound information via executing the executable instructions.

Other embodiments of the present disclosure will be apparent to those skilled in the art after taking the description into consideration and practicing the disclosure disclosed herein. This application is intended to cover any variations, uses, or adaptations of the disclosure following the general principles of the present disclosure and including common general knowledge or conventional technical means in the art that are not disclosed in the present disclosure. The description and embodiments are to be regarded as illustrative only, and the real scope and spirit of the present disclosure are pointed out in the claims.

it will be appreciated that the present disclosure is not limited to the exact construction that has been described above and illustrated in the drawings, and that various modifications and changes can be made without departing from the scope thereof. The scope of the present disclosure is limited by the appended claims only.

What is claimed is:

1. A visual display method for compensating sound information, applied to a touch terminal with a touch screen, a graphical user interface is rendered on the touch screen, the graphical user interface at least partially comprising a game scene, and at least part of a virtual object, wherein the method comprises:
   providing an orientation ruler on the graphical user interface, the orientation ruler comprising an orientation identifier for indicating an orientation;
   detecting a sound in a first preset range of the game scene, and when the sound in the first preset range of the game scene is detected, acquiring orientation information of a sound source of the sound; and
   generating a graphic identifier corresponding to the sound at a corresponding position of the orientation ruler according to the orientation information,
   wherein the method further comprises: acquiring a type of the sound, and determining a corresponding ideographic graph from preset ideographic graphs according to the type of the sound as the graphic identifier corresponding to the sound.

2. The method according to claim 1, further comprising:
   detecting a current orientation of the virtual object in the game scene, and indicating the current orientation of the virtual object on the orientation ruler.

3. The method according to claim 2, wherein the indicating the current orientation of the virtual object on the orientation ruler comprises:
   providing an orientation indicator on the graphical user interface, and controlling the orientation ruler to scroll on the graphical user interface according to the current orientation, wherein a position indicated by the orientation indicator on the orientation ruler is corresponding to the current orientation of the virtual object.

4. The method according to claim 1, wherein the orientation identifier comprises at least one of an orientation scale and an orientation description.

5. The method according to claim 1, wherein the first preset range is a region determined according to a position of the virtual object in the game scene.

6. The method according to claim 1, further comprising: acquiring a distance between the sound source of the sound and to the virtual object, and controlling a display form of the graphic identifier according to the distance.

7. The method according to claim 6, wherein the controlling the display form of the graphic identifier according to the distance comprises: controlling at least one of a size, a color, a brightness, a transparency, and a dynamic effect of the graphic identifier according to the distance.

8. The method according to claim 1, wherein the orientation information comprises at least one of a relative orientation of the sound source relative to the virtual object and an orientation of the sound source in the game scene.

9. A computer readable storage medium storing a computer program thereon, applied to a touch terminal with a touch screen, a graphical user interface is rendered on the touch screen, the graphical user interface at least partially comprising a game scene, and at least part of a virtual object, wherein the computer program is executed by a processor to implement:
   providing an orientation ruler on a graphical user interface, the orientation ruler comprising an orientation identifier for indicating an orientation;
   detecting a sound in a first preset range of a game scene, and when the sound in the first preset range of the game scene is detected, acquiring orientation information of a sound source of the sound; and generating a graphic identifier corresponding to the sound at a corresponding position of the orientation ruler according to the orientation information, wherein the processor is further configured to: acquire a type of the sound, and determine a corresponding ideographic graph from preset ideographic graphs according to the type of the sound as the graphic identifier corresponding to the sound.

10. An electronic device, applied to a touch terminal with a touch screen, a graphical user interface is rendered on the touch screen, the graphical user interface at least partially comprising a game scene, and at least part of a virtual object, wherein the electronic device comprises:

a processor; and a memory for storing executable instructions of the processor;

wherein, the processor is configured to execute following steps via executing the executable instructions:

providing an orientation ruler on a graphical user interface, the orientation ruler comprising an orientation identifier for indicating an orientation;

detecting a sound in a first preset range of a game scene, and when the sound in the first preset range of the game scene is detected, acquiring orientation information of a sound source of the sound; and generating a graphic identifier corresponding to the sound at a corresponding position of the orientation ruler according to the orientation information, wherein the processor is further configured to: acquire a type of the sound, and determine a corresponding ideographic graph from preset ideographic graphs according to the type of the sound as the graphic identifier corresponding to the sound.

11. The electronic device according to claim 10, wherein the processor is further configured to: detect a current orientation of the virtual object in the game scene, and indicate the current orientation of the virtual object on the orientation ruler.

12. The electronic device according to claim 11, wherein the processor is further configured to:

provide an orientation indicator on the graphical user interface, and control the orientation ruler to scroll on the graphical user interface according to the current orientation, wherein a position indicated by the orientation indicator on the orientation ruler is corresponding to the current orientation of the virtual object.

13. The electronic device according to claim 10, wherein the orientation identifier comprises at least one of an orientation scale and an orientation description.

14. The electronic device according to claim 10, wherein the first preset range is a region determined according to a position of the virtual object in the game scene.

15. The electronic device according to claim 10, wherein the processor is further configured to: acquire a distance between the sound source of the sound and the virtual object, and control a display form of the graphic identifier according to the distance.

16. The electronic device according to claim 15, wherein the processor is further configured to: control at least one of a size, a color, a brightness, a transparency, and a dynamic effect of the graphic identifier according to the distance.

17. The electronic device according to claim 10, wherein the orientation information comprises at least one of a relative orientation of the sound source relative to the virtual object and an orientation of the sound source in the game scene.

* * * * *